United States Patent [19]
Dresen et al.

[11] Patent Number: 6,086,354
[45] Date of Patent: Jul. 11, 2000

[54] TRACK-SUPPORTED ROTATABLE SHEET SUPPORT STRUCTURE FOR TWIN-SHEET THERMOFORMER

[75] Inventors: William L. Dresen, Baraboo; James P. Hart, Portage, both of Wis.

[73] Assignee: Alltrista Corporation, Indianapolis, Ind.

[21] Appl. No.: 09/388,226

[22] Filed: Sep. 1, 1999

Related U.S. Application Data

[62] Division of application No. 08/940,625, Sep. 30, 1997, Pat. No. 5,975,879.

[51] Int. Cl.$^7$ .............................. B29C 51/10; B29C 51/22
[52] U.S. Cl. ....................... 425/504; 264/297.5; 264/545; 425/388; 425/397; 425/508
[58] Field of Search ..................................... 425/388, 397, 425/DIG. 48, 504, 508; 264/297.3, 297.5, 297.6, 544, 545

[56] References Cited

U.S. PATENT DOCUMENTS

| | | |
|---|---|---|
| 2,932,874 | 4/1960 | Ludwig et al. . |
| 3,583,036 | 6/1971 | Brown . |
| 3,810,731 | 5/1974 | Anderson . |
| 3,867,088 | 2/1975 | Brown et al. ............................ 425/504 |
| 3,868,209 | 2/1975 | Howell . |
| 3,925,140 | 12/1975 | Brown . |
| 4,244,915 | 1/1981 | Boardman ................................ 264/551 |
| 4,555,377 | 11/1985 | Whiteside et al. . |
| 5,167,969 | 12/1992 | DeMaio, Jr. et al. . |
| 5,620,715 | 4/1997 | Hart et al. ................................ 425/143 |
| 5,800,846 | 9/1998 | Hart . |

*Primary Examiner*—Jan H. Silbaugh
*Assistant Examiner*—Dae Young Lee
*Attorney, Agent, or Firm*—Lathrop & Clark LLP

[57] ABSTRACT

Multiple legs elevate a central ring bearing, to which a ring-shaped rotatable plastic sheet support carousel is mounted. The carousel is fitted with a ring gear which engages with a drive system to position the carousel and the thermoplastic sheets supported from it. A multi-post vertical press is positioned with two posts extending upwardly interior to the ring bearing, and two posts extending upwardly exterior to the ring bearing. The ring bearing thus extends through the press, allowing the carousel to supply and remove plastic sheets to and from the press. An upper platen and a lower platen are mounted for vertical displacement to the posts, thereby ensuring a high degree of parallelism between the molds mounted to the platens, and accurate twin-sheet thermoforming. A plurality of rollers are mounted to the outer ring, and an elevated ring track is positioned beneath the outer ring, wherein the rollers engage with the elevated track to support a portion of the loads of the outer ring and the inner ring, the elevated track being positioned between the vertical press exterior posts and the vertical press interior post.

4 Claims, 4 Drawing Sheets

TRACK-SUPPORTED ROTATABLE SHEET SUPPORT STRUCTURE FOR TWIN-SHEET THERMOFORMER

CROSS REFERENCES TO RELATED APPLICATIONS

This application is a division of U.S. Application Ser. No. 08/940,625, filed Sep. 30, 1997, now U.S. Pat. No. 5,975,879, the disclosure of which is incorporated by reference herein.

STATEMENT AS TO RIGHTS TO INVENTIONS MADE UNDER FEDERALLY SPONSORED RESEARCH AND DEVELOPMENT

BACKGROUND OF THE INVENTION

The present invention relates to thermoforming apparatus in general, and to the sheet supporting structure for twin-sheet thermoformers in particular.

Plastic parts may be economically manufactured through the thermoforming process. An extruded plastic sheet of a desired thickness is heated to a softening temperature and then brought into contact with a mold. A number of vacuum holes are drilled in the mold through which air is drawn to cause the heated and softened plastic sheet to conform to the shape of the mold. The formed part is cooled rapidly, by impinging air or liquid cooling of the mold, and separated from the mold for trimming and final treatment. In single sheet thermoforming the minor variations in sheet position or orientation with respect to the mold are of little importance, as once the sheet is in contact with the mold it takes on the desired shape.

Twin-sheet thermoforming presents tremendously increased possibilities for part formation, but brings with it significant challenges. In twin-sheet thermoforming two sheets are heated, and a first sheet is detached from a carrier and disposed on a lower mold, where a vacuum is drawn to conform the sheet to the lower mold. The second sheet is positioned over the first sheet and drawn upwardly into an upper mold, where partial vacuum is applied to cause the second sheet to conform to the upper mold. The two formed sheets are then brought together, still in the molds, and fused at those regions where the sheets touch. To expedite the heating, molding, and removal of the plastic sheets from the machine, the sheets are carried on a rotating carousel-type carrier, which is pivoted about a rotational bearing located at the center of the carousel. The carousel passes between the upper mold and the lower mold.

Because the upper and lower molds must leave room for the carousel to pass between, the two molds are mounted separately, and great care must be exercised to achieve the desired level of parallel orientation between the upper mold and the lower mold. In a common twin-sheet thermoformer, the lower mold is connected to a platen that is supported on a sinuous inflatable tube—typically similar to a fire hose. Pressure is applied to the lower mold by inflating the tube, thereby driving the softened plastic sheets on the two molds together. However, if the pressure is uneven, or if the mold itself is caused to flex by the applied pressures, there is bound to be variation in the degree of parallelness between the sheets. Any unevenness can result in undesirable variations in molded part thickness and sheet fusion. To achieve adequate part dimensions, much trial and error adjustment of the machine, shimming of the molds, and other time-consuming steps may be required, sometimes requiring many hours to prepare for production.

To provide an acceptable margin of error in part dimensions, manufacturers often must utilize starting sheet stock which is thicker than might be absolutely called for by the article design. All these labor-intensive adjustments and overspecification of plastic thickness add to the cost of the end product. In addition, the difficulty of obtaining close tolerances in the molded parts puts restrictions on the type and complexity of part which may be economically produced in the twin-sheet thermoforming process.

What is needed is a structure for supporting plastic sheets for twin-sheet thermoforming which will allow the sheets to be presented to highly parallel thermoforming molds in a repeatable operation.

SUMMARY OF THE INVENTION

The sheet carrying support structure of this invention allows the attachment of thermoplastic sheets and the advancement of the sheets between two highly parallel thermoforming molds for repeatable and high accuracy forming of plastic parts. The support structure has a large diameter ring bearing which passes between the inner and outer posts of a multi-post vertical press. Sheets are clamped to a carousel frame carried on the ring bearing, and are moved thereon through the vertical press. By positioning some of the press posts interior to the ring bearing, and some exterior, the press can be opened and closed on the plastic sheets without interfering with the progress of the carousel. A plurality of rollers are mounted to the outer ring, and an elevated ring track is positioned beneath the outer ring, wherein the rollers engage with the elevated track to support a portion of the loads of the outer ring and the inner ring, the elevated track being positioned between the vertical press exterior posts and the vertical press interior post.

It is a feature of the present invention to provide a sheet carrying support structure for presenting plastic sheets to a press with a high level of parallelism between the upper thermoforming mold and the lower thermoforming mold.

It is another object of the present invention to provide a sheet carrying support structure which reliably carries sheets to a vertical press in a thermoformer.

It is also an object of the present invention to provide a sheet carrying support structure for continuously advancing multiple thermoplastic sheets through a multi-post vertical press.

Further objects, features and advantages of the invention will be apparent from the following detailed description when taken in conjunction with the accompanying drawings.

DESCRIPTION OF THE PREFERRED EMBODIMENTS

Figure 1:
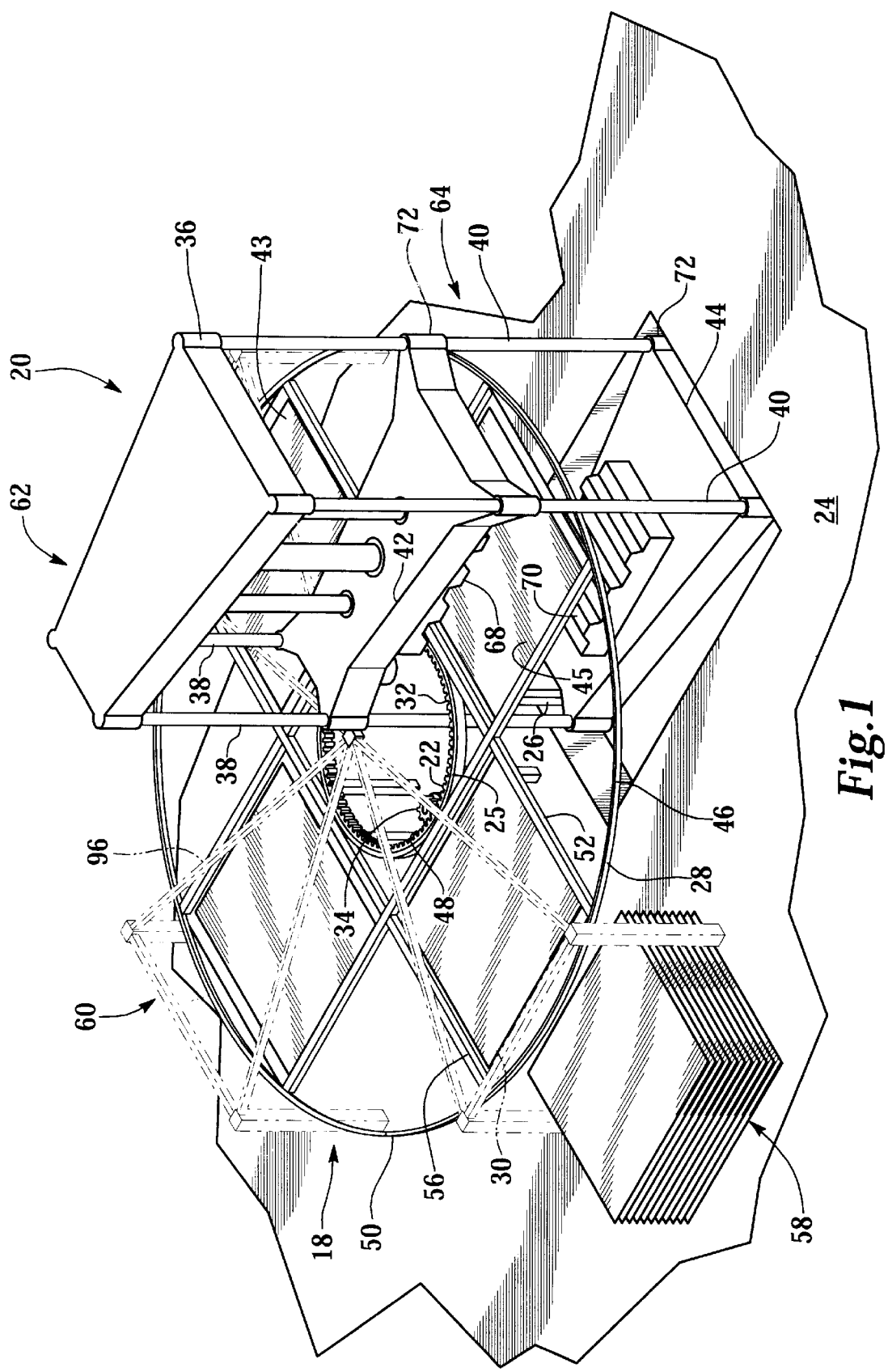
FIG. 1 is an isometric, somewhat schematic, view of the sheet carrying support structure of this invention as it relates to a twin-sheet thermoformer.

Referring more particularly to FIGS. 1–5, wherein like numbers refer to similar parts, a sheet carrying support structure 18 of this invention is shown schematically in FIG. 1. The support structure 18 serves to reliably engage sheets of thermoplastic material for servicing in a rotary fashion a multi-post vertical press 36 in a twin-sheet thermoforming apparatus or thermoformer 20. The support structure 18 has a central elevated ring bearing 22 which is elevated above the support floor 24 on a frame 25 having six legs 26. A carousel 28 is supported for rotation on the ring bearing 22, and is outfitted with a pneumatic clamping system 30 for releasably engaging thermoplastic sheets 43, 45.

The carousel 28 is driven by the thermoformer's drive system 34 to position the thermoplastic sheets within the vertical press 36. The vertical press 36 is positioned with two interior posts 38 extending upwardly within the ring bearing 22, and two exterior posts 40 extending upwardly outside the ring bearing. The ring bearing 22 thus extends through the press 36, allowing the carousel 28 of the sheet carrying support system 18 to engage and support the plastic sheets as they are supplied and removed from the press.

The ring geometry of the carousel 28 and the support structure 18 allows the press 36 to include uninterrupted vertical members such as the posts 38, 40. Such presses are available in various sizes and pressure levels, but have the particular advantage of being capable of retaining a very high degree of parallelism between an upper platen 42 and a lower platen 44 mounted for vertical displacement to the posts 38, 40. As the platens 42, 44, are driven vertically, the established verticality of the posts enforces continued parallelism between the platens and the upper and lower thermoforming molds 68, 70 which are mounted to the platens.

The size of the sheet carrying support structure 18 will be dictated by the overall dimensions of the thermoformer with which it is employed. Larger thermoformers may require carousel diameters on the order of 40 feet in diameter. Since, in a preferred embodiment, the carousel 28 will be supported entirely from its interior rim, and will be primarily cantilevered out into the press and the other stations of the thermoformer, the ring bearing 22 must be selected to adequately support these bending loads. The ring bearing 22 may be a conventional recirculating ball bearing assembly.

Figure 2:
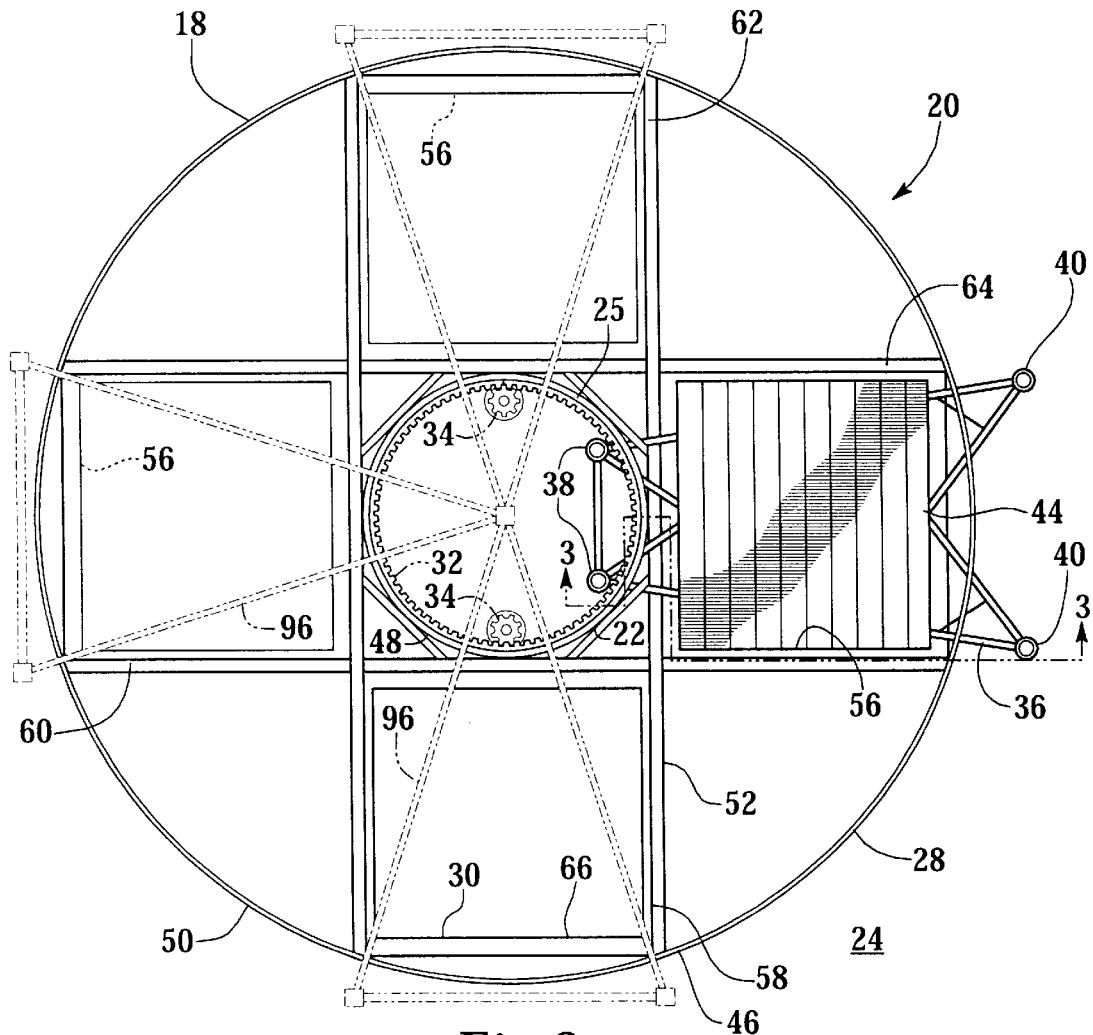
FIG. 2 is a top plan view of the apparatus of this invention in use with a twin-sheet thermoformer.

As shown in FIG. 2, the carousel 28 includes a large doughnut-shaped weldment 46 with an inner ring 48 which may be provided with an inwardly-toothed ring gear 32 to engage with the drive system of the thermoformer 20. If required by the drive system of the particular thermoformer with which the support structure 18 is used, the gear teeth may be formed on the exterior of the ring gear. The inner ring 48 is fixed to the rotatable portion of the ring bearing 22. If desired, the frame 25 legs 26 may elevate the ring bearing 22 approximately seven feet above the support floor 24, to provide clearance for personnel to pass beneath the carousel 28. However, if such clearance is not a concern, the legs 26 may be made considerably shorter. An outer ring 50 is joined by a grid of tubular steel spokes 52 to the inner ring 48 of the carousel 28. The inner ring 48, the outer ring 50, and the spokes 52 of the weldment are preferably all formed of square tubular steel elements which are welded together. The carousel 28 weldment 46 has members arrayed to define four rectangular sheet-receiving openings 56. The openings 56 are each 90 degrees from one another such that when one opening 56 is centered within one of the thermoformer stations, all the other three openings 56 are also centered. The stations of the thermoformer 20, as best shown in FIG. 1, are the load/unload station 58, the first heating station 60, the second heating station 62, and the molding station 64 at the press 36. A sheet clamping frame 66 is located within each sheet-receiving opening 56. The size of the opening 56 may be designed to accept any desired size and number of sheets, as may the clamping frame 66. The clamping frame 66 may have a plurality of air-actuated clamps which form a part of the pneumatic clamping system 30. Alternatively, mechanical clamping systems or other means for releasably holding the sheets within the clamping frame may be employed.

An appropriate drive system 34 engages the ring gear 32 of the support structure 18 of this invention, to rotate the carousel in 90 degree increments to load and unload sheets, heat sheets, and mold sheets. As shown in FIG. 2, the carousel 28 rotates through the press 36. An upper thermoforming mold 68 is fixed to the upper platen 42 of the press, and a lower thermoforming mold 70 is fixed to the lower platen 44 of the press. Each of the platens 42, 44, has four vertical sleeves 72, one encircling each of the interior posts 38 and exterior posts 40. Because of the tolerances on the vertical sleeves, a high degree of parallelism is imposed on the upper and lower platens, and hence the molds are maintained in parallel relation throughout their travel in the press.

Figure 4:
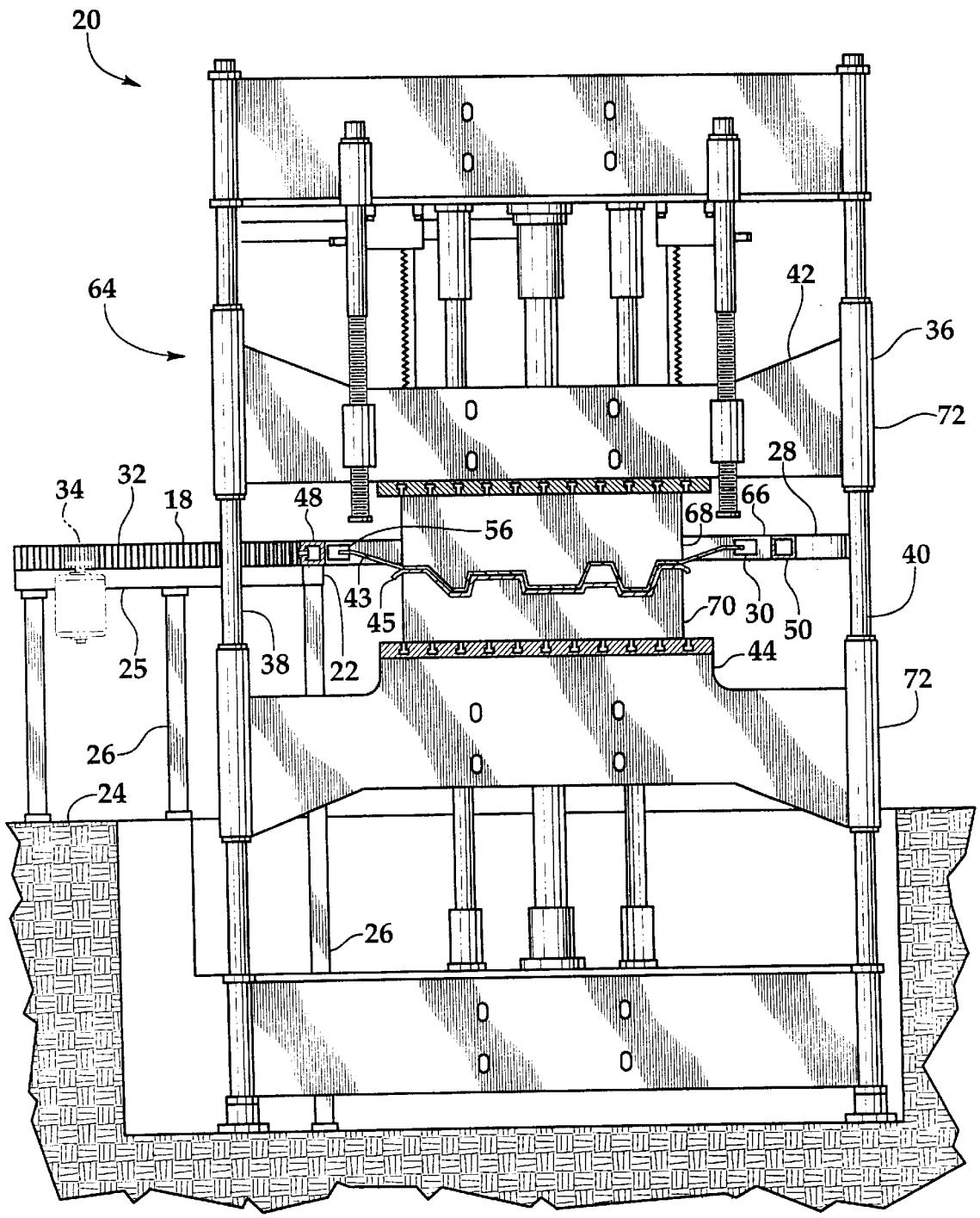
FIG. 4 is a cross-sectional view of the apparatus of FIG. 3 with the press closed.

As shown in FIG. 4, the upper mold 68, in the closed press position, extends down below the upper platen 42 through a sheet-receiving opening 56, while the upper platen 42 itself remains positioned above the doughnut-shaped weldment of the carousel 28. Typically in the press closed position the lower thermoforming mold 70 will be brought up toward the upper thermoforming mold 68.

As shown in FIG. 2, in a preferred embodiment, the sheet carrying support structure will accommodate exterior posts 40 of the press 36 which are spaced farther apart than are the interior posts 38, the spacing of which is limited by the diameter of the inner ring 48. Greater stability in the press is obtained by wider spacing of the exterior posts 40. The required press load capacity will vary depending on the particular parts to be molded, especially their size. Higher press pressures have numerous molding advantages, among them are: allowance for greater air pressure introduced between the molded sheets, better pinch, cooler molds, and faster molding.

It is common in twin-sheet thermoforming to inject air between the two engaged sheets through a needle. Because of the greater pressure which can be applied by the press, the air pressure injected between the sheets can be increased. This higher pressure not only helps to get better part definition by forcing the plastic against the molds, but also has an advantageous cooling effect on the part.

The sheet carrying support structure 18 makes possible the use of multi-post vertical presses with twin-sheet thermoformers, and hence offers much greater parallelism to the thermoformed part. A number of significant advantages in thermoforming quality and cost-effectiveness are achieved by the high degree of parallelism offered by the vertical press 36. First is the improvement in tolerances which may be maintained on the thermoformed part. These improved tolerances make it possible to employ thermoformed parts in circumstances where limited variations in part dimension are allowed—for example in roboticly manipulated pallets and dunnage trays. Moreover, greater control over the positioning of the molds over the entire width of the part means the desired degree of fusion between the sheets can be uniformly maintained. Greater uniformity in fusion, depending on the part, can mean greater strength and longer part life. An economic benefit of this control is that starting sheet thickness can be selected at the minimum level needed to obtain required part strength. A lower margin of error means that less sheet thickness need be provided to account for variations in fusion and part thickness. For example, where a traditional twin-sheet thermoforming apparatus might require a starting sheet thickness of 0.135 inches, a thermoformer 20 employing a vertical press serviced by the sheet carrying support structure of this invention could use a sheet of 0.125–0.130 inches thick to achieve a part with comparable performance.

Greater accuracy in molding also contributes to reduced weight, and hence cost, of the molded parts. Typically twin-sheet thermoformed molds have regions to receive excess plastic which is diverted from a structural feature of the part in molding. Such regions are essential when the exact dimensions of the molded part are subject to greater fluctuation. By precisely bringing the molds together with a high level of parallelism, these take-up regions can be made smaller or eliminated.

Another advantage of the greater parallelism between the molds is that the molds themselves will be subjected to greatly reduced bending moments from those expected in a conventional thermoforming apparatus. Hence the molds need not be as stiff and may successfully be formed of materials which have higher heat conductivity than aluminum but less stiffness, for example beryllium.

The thermoformer 20 has two heating stations 60, 62, so two thermoplastic sheets may be simultaneously heated and prepared for molding. The sagging first heated sheet at the first heating station 60 is advanced on the sheet carrying support structure 18 by the drive system 34 and brought into position in the second heating station 62, where it is further heated while the second sheet is heated in the first heating stations. The overhead ovens of the heating stations may be supported on an oven support framework 96 which is independent of the support structure 18. The driven support structure then carries both sheets into the thermoforming molds on the vertical press.

It should be noted that although the sheet carrying support structure of this invention has been disclosed in conjunction with a four post vertical molding press, the support structure may in a like manner be used with a press having three posts, with one interior to the ring bearing and two exterior.

Figure 5:
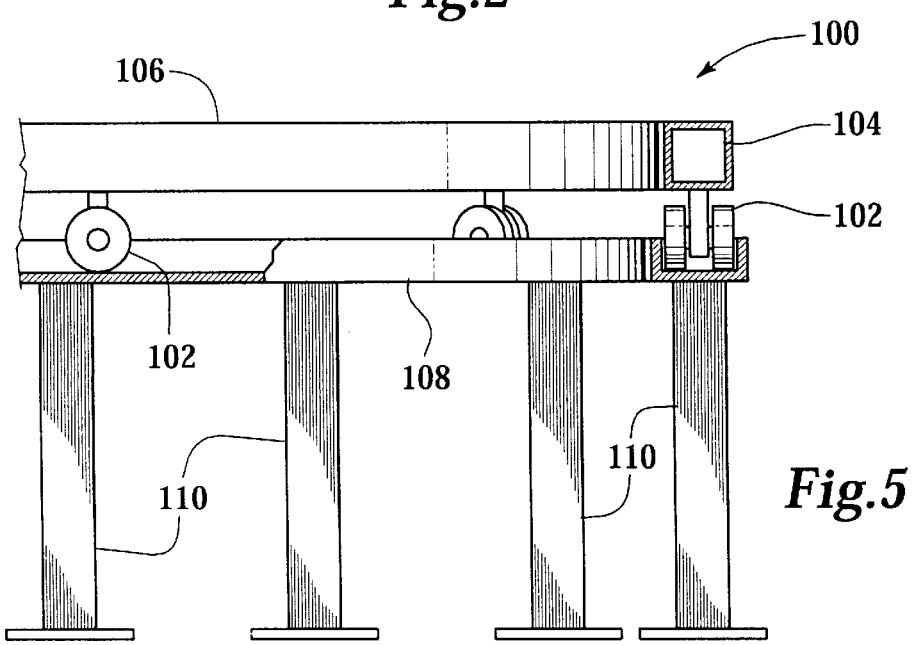
FIG. 5 is a fragmentary cross-sectional view of an alternative embodiment sheet carrying support structure of this invention which has exterior track support of the carousel.
Figure 3:
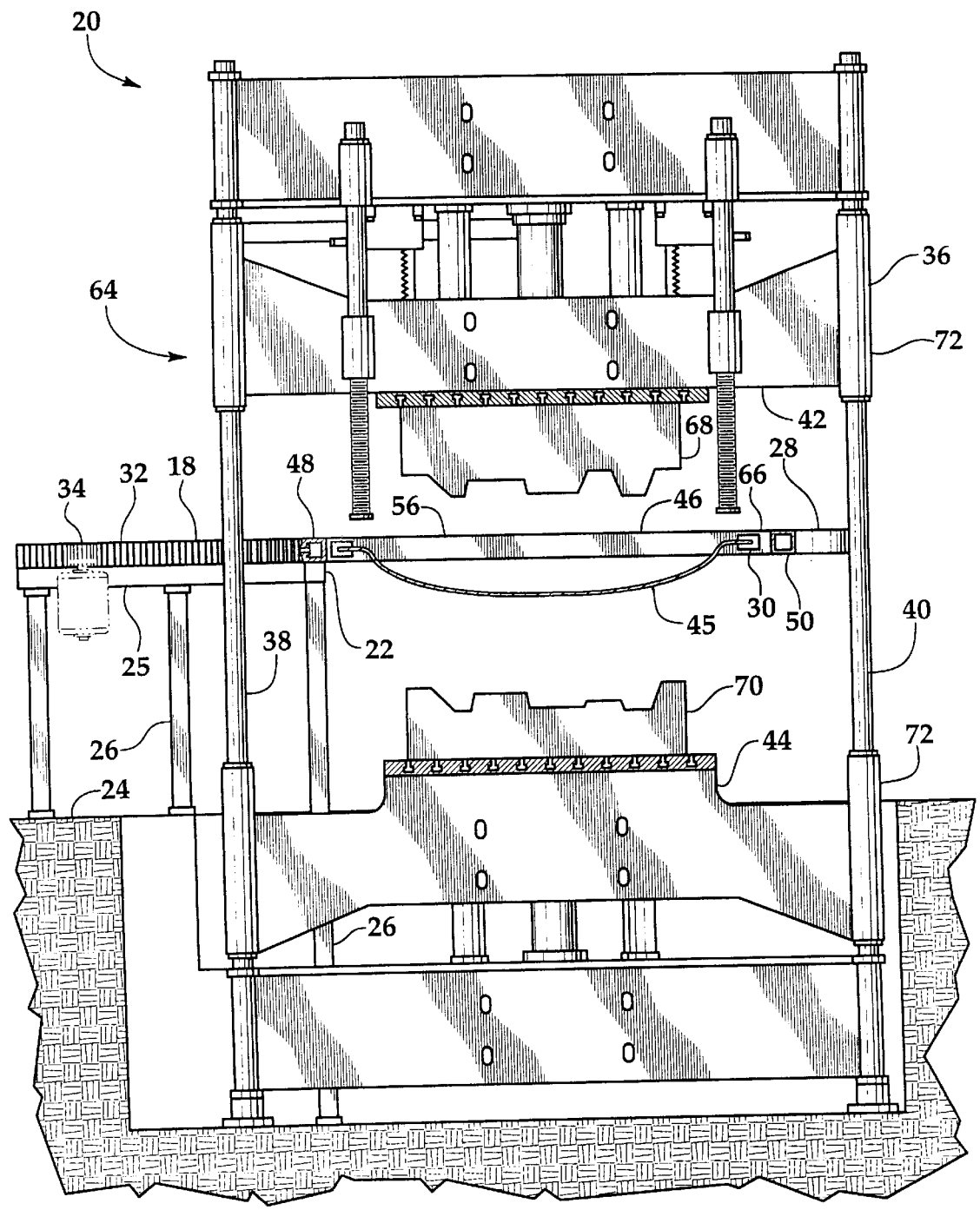
FIG. 3 is a cross-sectional view of the apparatus of FIG. 2 taken along section line 3—3, with the press open.

Although the carousel weldment has been disclosed as unsupported at its outer perimeter and hence supported entirely from the inner ring bearing, an alternative embodiment sheet carrying support structure 100, shown in FIG. 5, provides additional support to the carousel at its exterior perimeter. The sheet carrying support structure 100 has a plurality of rollers 102 which are mounted to the outer ring 104 of the carousel 106. An elevated ring track 108 is positioned beneath the outer ring 104 on support legs 110. The rollers 102 engage with the elevated track 108 to support a portion of the loads of the outer ring and the inner ring. The continuous elevated track is positioned between the vertical press exterior posts and the vertical press interior posts so as not to interfere with the closing of the press. Although less desirable from the standpoint of requiring multiple rollers which would eventually require replacement, such an approach may be desirable in that it reduces the need for the bearing to support cantilevered loads. If desired, the outer ring may alternatively be provided with structure for engagement with an exterior drive.

Although the frame has been described as having six legs, a greater or lesser number of legs may be employed.

It is understood that the invention is not limited to the particular construction and arrangement of parts herein illustrated and described, but embraces such modified forms thereof as come within the scope of the following claims.

We claim:

1. A sheet carrying support structure for supporting thermoplastic sheets in a twin-sheet thermoforming apparatus, the support structure comprising:

an elevated ring bearing;

a rotatable carousel which supports at least a first thermoplastic sheet and a second thermoplastic sheet, the carousel being rotatably mounted on the ring bearing, the carousel defining an interior opening through which at least one interior vertical post of a vertical press may extend, and having an exterior perimeter which extends between the at least one interior vertical post and a plurality of exterior posts of a vertical press;

a plurality of rollers mounted to the carousel outer perimeter; and an elevated ring track positioned beneath the outer perimeter, wherein the rollers engage with the elevated track to support a portion of the loads of the carousel, the elevated track being positioned between the vertical press exterior posts and the vertical press interior post.

2. A sheet carrying support structure for supporting thermoplastic sheets for displacement within a twin-sheet thermoforming apparatus, the support structure comprising:

a support frame elevated above a support surface on a plurality of legs;

an inner ring mounted for rotation to the support frame;

members which extend radially outwardly from the inner ring to define a plurality of sheet receiving openings, wherein an inner ring interior is defined within the inner ring which is large enough to receive at least one interior vertically extending post of a vertical press, and wherein the radially outwardly extending members are sufficiently short that they do not engage a plurality of exterior posts of said vertical press, so that thermoplastic sheets supported on the radially extending members are rotatable on the support frame without interference with the vertical posts of said vertical press;

an outer ring connected to the inner ring by the radially extending members;

a plurality of rollers mounted to the outer ring; and an elevated ring track positioned beneath the outer ring, wherein the rollers engage with the elevated track to support a portion of the loads of the outer ring and the inner ring, the elevated track being positioned between the vertical press exterior posts and the vertical press interior post.

3. A sheet carrying support structure for advancing thermoplastic sheets between an upper mold and a lower mold mounted to an upper platen and a lower platen respectively of a vertical press having at least one interior vertical post and two exterior vertical posts with the upper platen and lower platen mounted to the posts, the sheet carrying support structure comprising:

an inner ring;

an outer ring connected to the inner ring;

a plurality of sheet receiving openings defined between the inner ring and the outer ring;

a frame to which the inner ring is mounted, wherein the frame elevates the inner ring and the outer ring to be below the lowest position of the upper platen and above the highest position of the lower platen;

means for mounting the inner ring to the frame for rotatable displacement, wherein the vertical press at least one interior vertical post is positioned within the inner ring, and the vertical press two exterior vertical posts are positioned exterior to the inner ring and the outer ring, the rotatable displacement of the inner ring bringing each sheet receiving opening between the upper platen and the lower platen and the molds mounted thereon for vertical displacement of the molds to mold thermoplastic sheets supported within the sheet receiving openings;

a plurality of rollers mounted to the outer ring; and an elevated ring track positioned beneath the outer ring, wherein the rollers engage with the elevated track to support a portion of the loads of the outer ring and the inner ring, the elevated track being positioned between the vertical press exterior posts and the vertical press interior post.

4. A sheet carrying support structure and molding station for supporting and forming thermoplastic sheets in a twin-sheet thermoforming apparatus, comprising:

an elevated ring bearing; and a vertical press having a plurality of parallel vertical posts, the press having a lower platen mounted to the posts and an upper platen mounted to the posts above the lower platen, the upper platen and lower platen being mounted to the posts to allow the parallel closing of an upper mold mounted to the upper platen on a lower mold mounted to the lower platen;

a rotatable carousel which supports at least a first thermoplastic sheet and a second thermoplastic sheet, the carousel being rotatably mounted on the ring bearing, the carousel defining an interior opening through which at least one interior vertical post of the vertical press extends, and having an exterior perimeter which extends between the at least one interior vertical post and a plurality of exterior posts of the vertical press;

a plurality of rollers mounted to the exterior perimeter of the carousel; and an elevated ring track positioned beneath the carousel outer perimeter, wherein the rollers engage with the elevated track to support a portion of the loads of the carousel, the elevated track being positioned between the vertical press exterior posts and the at least one vertical press interior post.

* * * * *